United States Patent
Kong et al.

(10) Patent No.: US 6,762,427 B1
(45) Date of Patent: Jul. 13, 2004

(54) OBJECT SURFACE CHARACTERIZATION USING OPTICAL TRIANGULATON AND A SINGLE CAMERA

(75) Inventors: Hongzhi Kong, Kokomo, IN (US); Kambiz S. Panahi, Carmel, IN (US); Qin Sun, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/327,698

(22) Filed: Dec. 20, 2002

(51) Int. Cl.[7] ............................................. G01V 8/00
(52) U.S. Cl. ............................. 250/559.22; 250/559.23; 250/559.27; 356/601
(58) Field of Search .................... 250/559.22, 559.23, 250/559.27; 356/601, 602, 608, 614, 622–623

(56) References Cited

U.S. PATENT DOCUMENTS

| | | | |
|---|---|---|---|
| 5,912,738 A | * | 6/1999 | Chason et al. ............... 356/601 |
| 6,578,961 B2 | * | 6/2003 | Vaez-Iravani ............ 356/237.2 |

\* cited by examiner

*Primary Examiner*—David Porta
*Assistant Examiner*—Patrick J. Lee

(74) *Attorney, Agent, or Firm*—Robert M. Sigler; Stefan V. Chmielewski

(57) ABSTRACT

Electromagnetic radiation is directed from an optical grating in a regular array of beams in rows and columns toward a target object surface; and the reflected beams are focused through a lens to form beam images on an image plane of a single camera. Each of the beam images has a position on the image plane that moves substantially linearly with variation of a target distance between the optical grating and a point on the object surface from which that beam image is reflected; and the direction of the substantially linear movement of each beam image forms a predetermined angle with the column of the array of beam images on the image plane to which that beam belongs at a common target distance. Positional data for each of the beam images on the image plane is derived and provided to a processor which uses stored reference data defining predetermined beam paths in the image plane for the beam images to locate and determine the associated one of the predetermined beam paths for each of the beam images on the image plane, determine the location of each of the beam images along its associated predetermined beam path, determine the target distance for that beam and store an array of the determined target distances for each of the located beam images to characterize the object surface. The predetermined angle may provide for each beam having a separate predetermined beam path. For greater resolution, some of the beam paths may have two associated beams, and processing is provided to distinguish the beams on a single beam path uniquely.

16 Claims, 11 Drawing Sheets

US 6,762,427 B1

OBJECT SURFACE CHARACTERIZATION USING OPTICAL TRIANGULATON AND A SINGLE CAMERA

TECHNICAL FIELD

The technical field of this invention is object surface characterization using optical triangulation ranging.

BACKGROUND OF THE INVENTION

When cameras are used for optical triangulation ranging, the most common approach requires a stereo vision system. Besides the cost and speed disadvantages, the distance measurement accuracy of the system is typically poor when the object lacks surface texture. In some alternative approaches, temporally encoded probing beams can be used with a single camera for triangulation. In those systems, the probing beams are sequentially directed to different parts of the object through beam scanning or control of light source arrays. But such methods are either not suitable for high volume production or they are limited in spatial resolution. Because the distance is measured one point at a time, fast two dimensional (2D) ranging cannot be achieved unless an expensive high-speed camera is used.

The real challenge of using a single camera with simultaneously projected probing beams for triangulation is to efficiently distinguish each individual beam image from the rest of the beam images on the image plane. The target distance is measured through the correlation between the distance of the target upon which the beam is projected and the location of the returned beam image on the image plane. Such a correlation is different for each beam. When multiple beam images are simultaneously projected, one particular location on the image plane may be correlated with several beam images with different target distances. In order to measure the distance correctly, each beam image must be labelled without ambiguity.

SUMMARY OF THE INVENTION

Electromagnetic radiation is directed from an optical grating in a regular array of beams in rows and columns toward a target object surface; and the reflected beams are focused through a lens to form beam images on an image plane of a single camera. Each of the beam images has a position on the image plane that moves substantially linearly with variation of a target distance between the optical grating and a point on the object surface from which that beam image is reflected; and the direction of the substantially linear movement of each beam image forms a predetermined angle with the column of the array of beam images on the image plane to which that beam belongs at a common target distance. Positional data for each of the beam images on the image plane is derived and provided to a processor which uses stored reference data defining predetermined beam paths in the image plane for the beam images to locate and determine the associated one of the predetermined beam paths for each of the beam images on the image plane, determine the location of each of the beam images along its associated predetermined beam path, determine the target distance for that beam and store an array of the determined target distances for each of the located beam images to characterize the object surface. The predetermined angle may provide for each beam having a separate predetermined beam path. For greater resolution, some of the beam paths may have two associated beams, and processing is provided to distinguish the beams on a single beam path uniquely.

For embodiments in which some predetermined beam paths are associated with pairs of beam images, the beam images can be uniquely identified by the presence of only one of the beam images in a range of locations defined by a region cutoff datum in which only that beam may be found and the location of the other of the pair of beam images outside the region. If neither of the pair of beam images is located in the range of locations, the beam images may be uniquely identified by examining their locations relative to those of other uniquely identified beam images in other beam paths.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
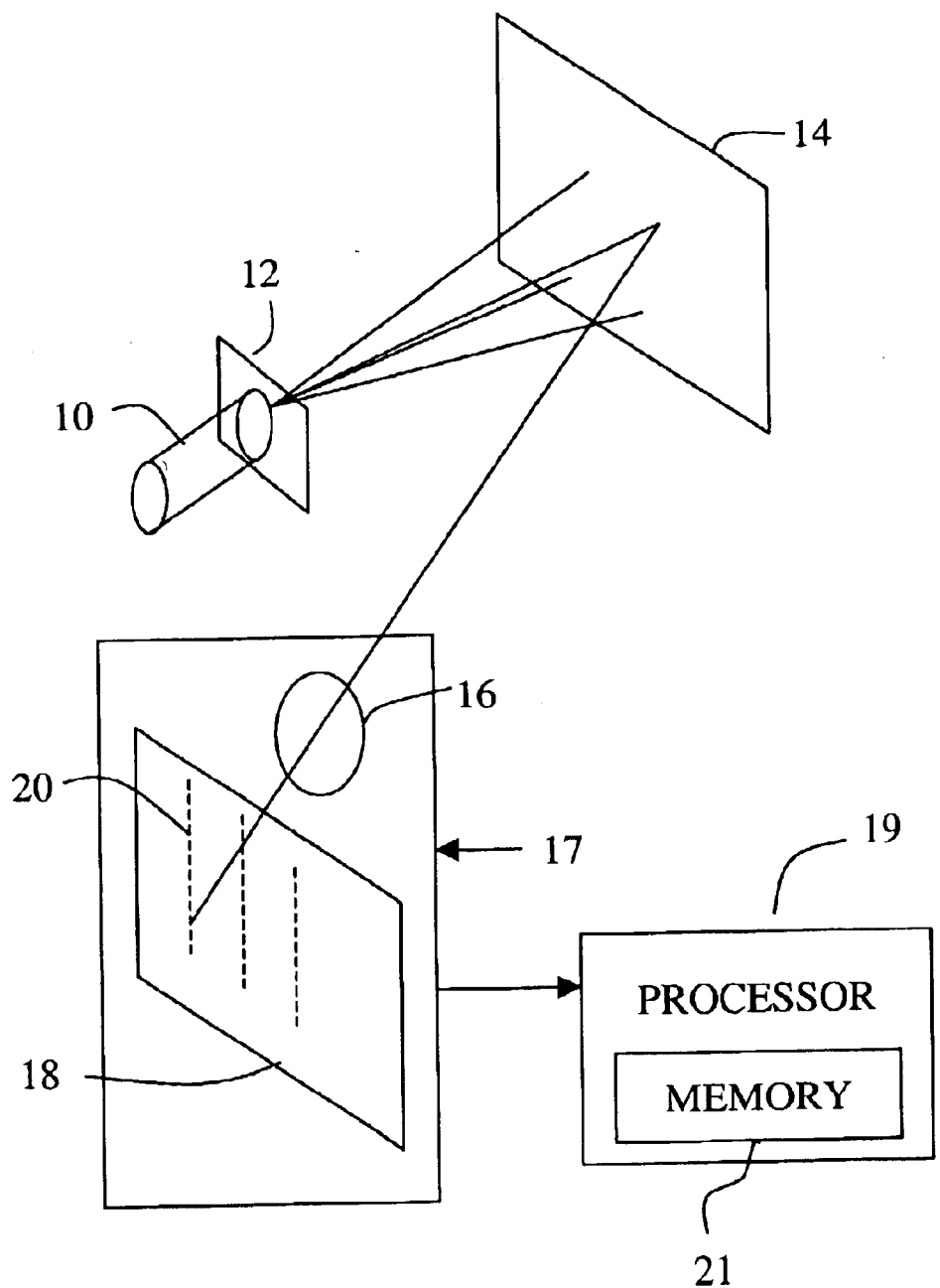
FIG. 1 is a perspective view of an optical surface sensing system configuration.
Figure 2A:
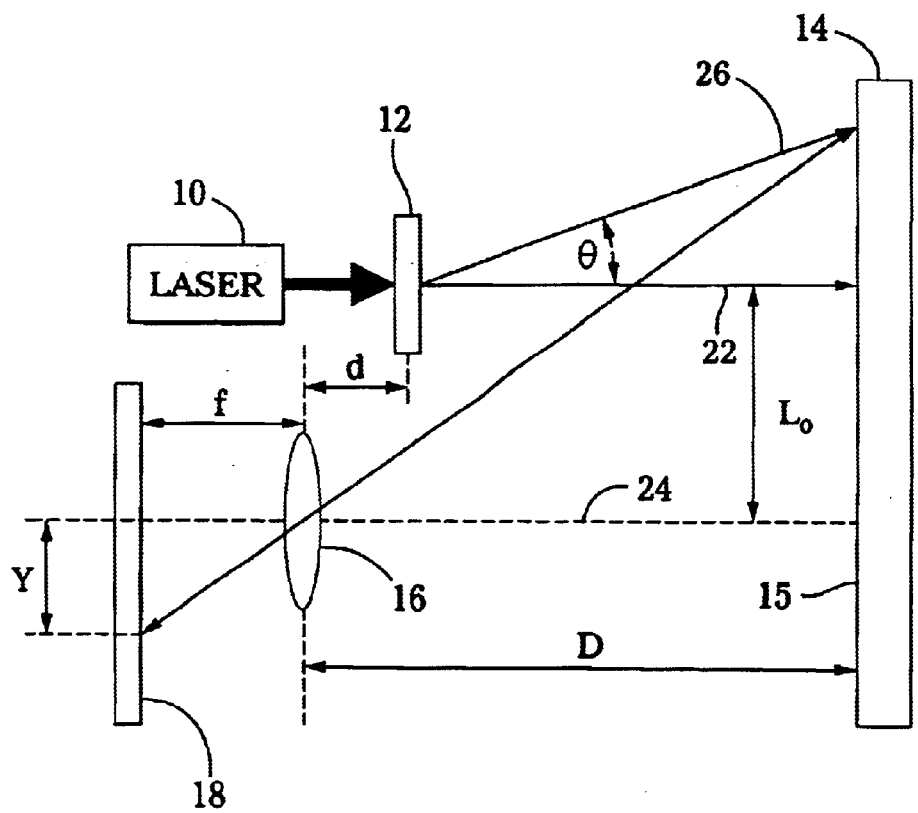
FIGS. 2A and 2B show mathematical vertical and horizontal triangulation relationships for the system of FIG. 1.
Figure 2B:
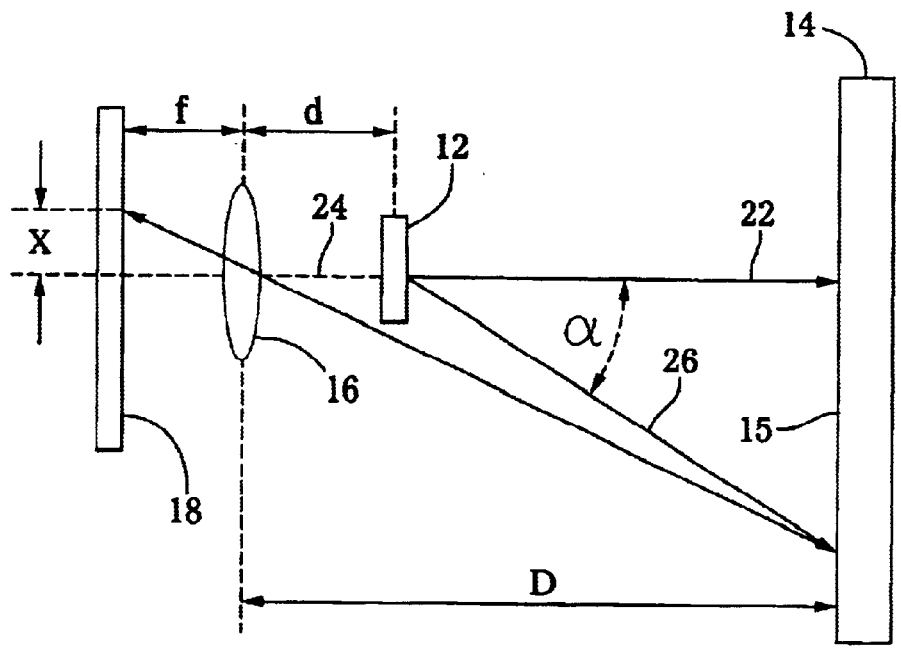

FIGS. 1, 2A and 2B show an optical surface configuration sensing system. A laser or similar source of electromagnetic radiation 10 directs an optical beam to an optical diffraction grating 12 that splits the beam into a plurality of beams producing a rectangular grid pattern on the surface 15 of a target 14. The beams are reflected from the target surface 15; and a camera 17 is positioned to receive the reflected beams. In camera 17, each beam is focused by a lens 16 onto an image surface 18 providing an image plane 20. A processor 19 having memory 21 is provided to provide processing of the images on image plane 20.

Referring particularly to FIG. 2A, target 14 is shown as having a surface 15 in an x-y plane at a distance D in the z direction from lens 16, where the x direction is perpendicular to the page and the z and y directions are horizontal and vertical, respectively on the page. Grating 12 is closer than lens 16 to surface 15 in the z direction by a distance d; and image plane 18 is a distance f from lens 16 in the opposing z direction direction. The center 22 of grating 12 is a distance $L_0$ from the lens axis 24 in the y direction. A beam 26 is directed by grating 12 at an angle θ from the horizontal (z) axis to strike the target surface 15 and is reflected back through lens 16 of camera 17 to strike the camera's image plane 18 distance $Y_1$ from the lens axis 24. Vertical triangulation is based on a mathematically derived relationship expressed in the following equation:

$$Y = \{f[L_0 + (D-d)\tan\theta)]\}/D$$

For a given target distance, the preceding equation uniquely defines an image location Y in the image plane. Thus, the target distance may be derived from the image location in the following equation, if d is chosen to be zero (the diffraction grating is placed in the same plane as the camera lens):

$$Y = f(L_0/D + \tan \theta)$$

When two dimensional probing beams are involved, there is generally horizontal triangulation also. The horizontal triangulation arrangement is shown in FIG. 2B, wherein the diffracted beam angle is α and the image location is X. The mathematical relationship is expressed in the following equation:

$$X = f^* \tan \alpha (1 - d/D)$$

Since the beams have different horizontal diffraction angles (α), the spatial separation between the beams will be non-uniform as D varies. But if d is made zero (the diffraction grating is placed in the same plane as the camera lens), the dependence will disappear. In the latter case, the X distance may be derived from the following equation:

$$X = f^* \tan \alpha$$

Thus, an optical configuration is chosen as described above with the optical grating 12 placed in the same plane as that of the camera lens. The horizontal triangulation, which causes difficulties for spatial encoding, can be eliminated. Such an arrangement allows the use of larger beam densities, larger field of view and larger sensing ranges for simultaneous multiple beam ranging with a single camera and 2D probing beams.

Figure 3:
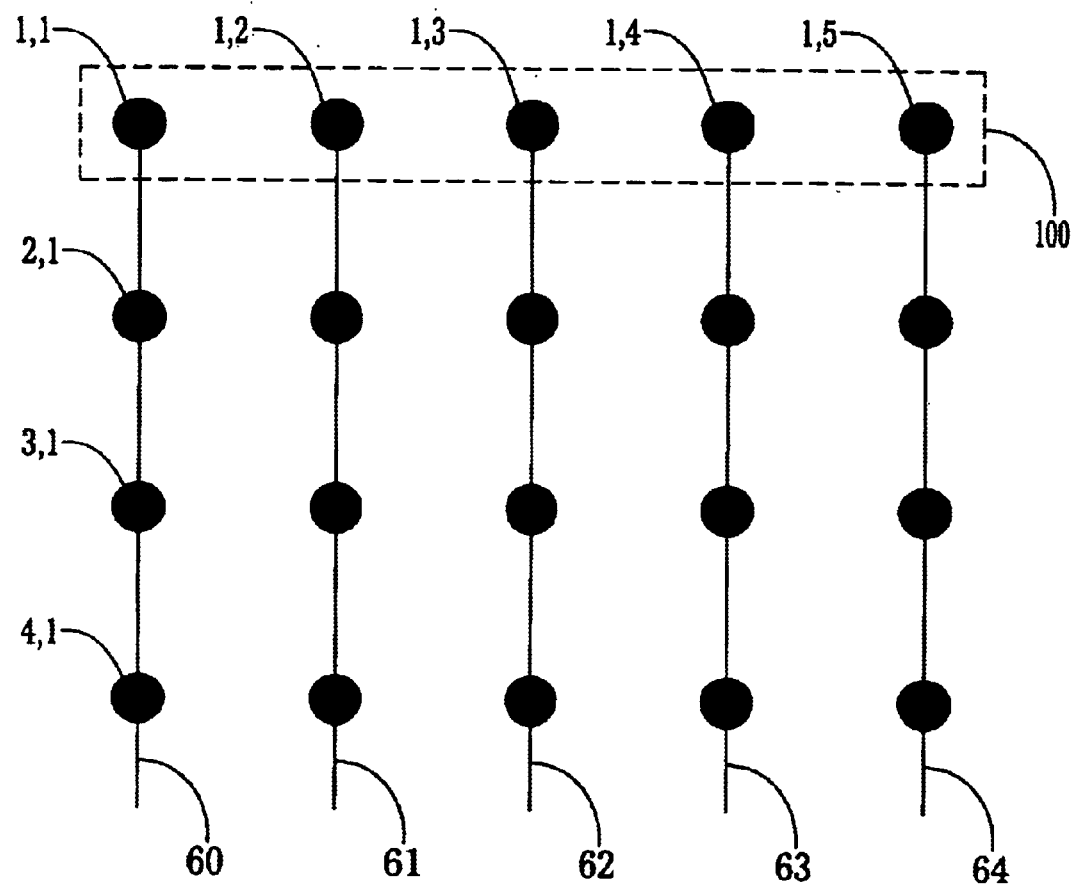
FIG. 3 shows a prior art beam array with a common beam path for all beams in a column.

Using the apparatus described above, a two dimensional (2D) array of beams may be generated by optical grating 12 that comprises a first predetermined number of rows of beams, each row containing a second number of individual beams. Each of the beams, when reflected from surface 15, forms a beam image which lies somewhere on a beam path in the image plane 18, wherein the beam paths of all beam images are straight, generally parallel lines (vertical in this example). For example, FIG. 3 shows a 5×4 array of beam images reflected from a flat surface onto the image plane, wherein the horizontal rows of beam images are aligned perpendicularly with the vertical beam paths. With sufficient spacing between the beam paths, all the individual beam images of a row, such as those (1,C with C=1,2,3,4,5) enclosed within the dashed line box 100, are readily distinguishable. But beam images in the same column (R,1 with R=1,2,3,4) share the same beam path; and the beam paths are thus not unique for each beam image. With a non-planar reflecting surface, the location of each beam image on its beam path will change vertically from the regular spacing shown in FIG. 3, and some beam images on the same beam path may become confused with other beams in the same column with respect to which beam is in what row. Temporal and spatial encoding can be combined to label remove this confusion, for example by presenting only one row at a time; but this requires more complex and expensive equipment, as well as more time, to measure the entire 2D range.

Figure 4:
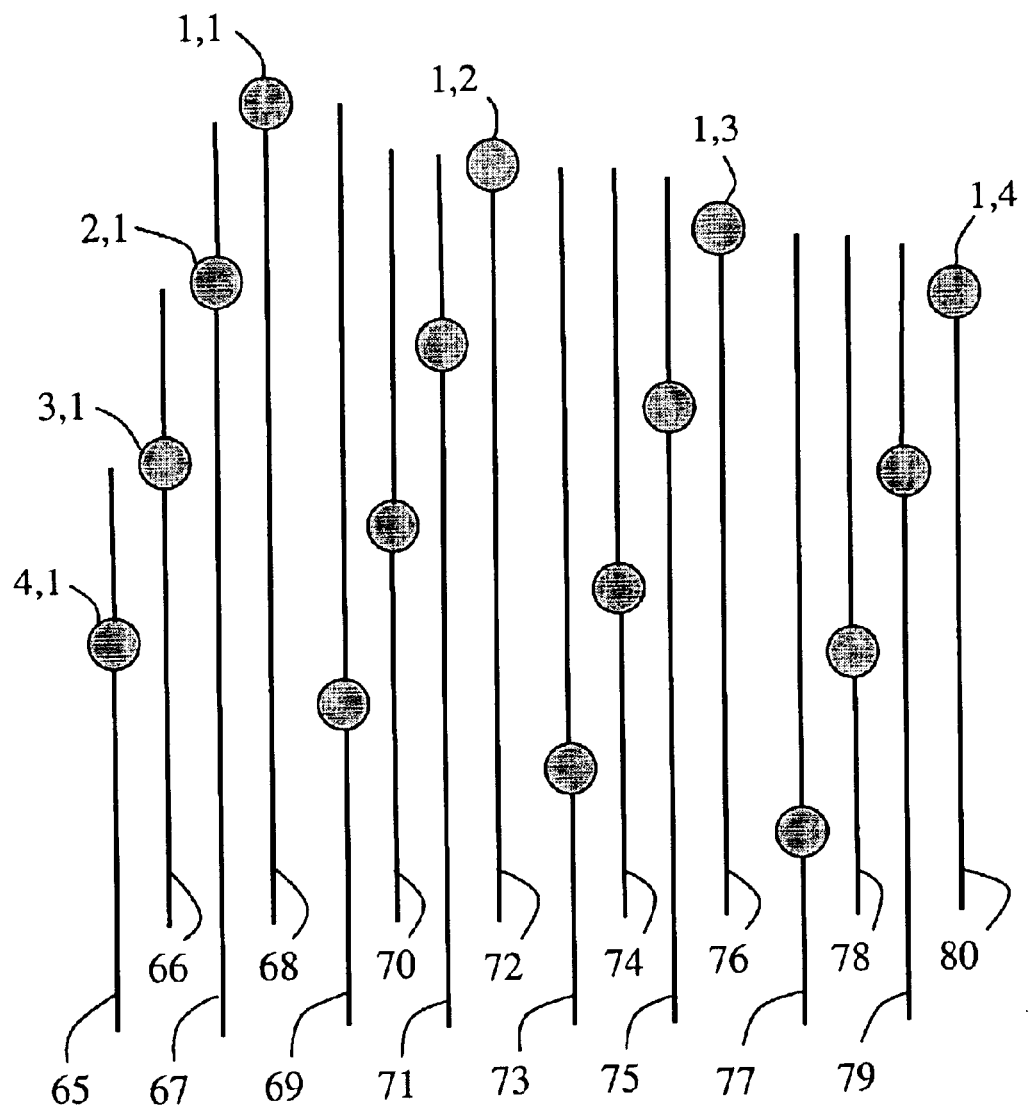
FIGS. 4–6 show beam arrays according to this invention.

In this document, to "label" a beam or beam image means to uniquely identify it on a beam image path or in a particular location within a beam array and provide it with a unique identifying datum in memory for processing. In order to label 2D beam images projected simultaneously, the spatial distribution of the probing beam pattern must be reconfigured so that only a minimum number of beam images are associated with each beam path. Such a configuration may be realized by horizontally shifting the location of each row, which can be accomplished by rotating the triangulation direction or by rotating the beam matrix. An example of such an arrangement is shown in FIG. 4, in which a portion of an M (row)×N (column) beam matrix is essentially rotated relative to the beam path direction by an angle θ (beam path to column direction) so as to provide separate, identifiable beam paths 65–80 for each separate beam image simultaneously. If the inter-beam image distance in each row is a and in each column is b, the angle of rotation required is $\theta = \tan^{-1}(a/Nb)$.

The example of FIG. 4 is a portion of a 4×4 beam image dot matrix that was projected using a pulsed IR laser and a diffraction grating as shown in FIG. 1. The inter-beam image distance (angle) was 1.5 degrees in both the horizontal and vertical directions. The beam matrix was rotated by 14 degrees relative to the triangulation direction. A VGA camera was synchronized with the laser pulses. The vertical separation between the camera and lens was 60 mm. In order to reject the background from the scene, two consecutive frames with probing beams on and off were subtracted from each other to extract the beam images. The images were transferred from the camera to a computer through an image frame grabber for further processing.

The beam image labelling process for the matrix of FIG. 4 begins with creation of the beam paths. Over the sensing range, the center of gravity of each beam image is recorded at different target distances (a planar target is convenient but is not required). The beam images may be distinguished from noise by their strength and spatial location: with good quality equipment, the beam images will generally be stronger than noise artifacts and will create a recognizable grid pattern. Once all beam images are identified, any other artifact in the image plane may be ignored. Linear fit to the beam image positions is then used to create the beam paths. The calculated beam paths are stored as a look-up table for later use. With the beam paths stored, the system can be calibrated (for distance as a function of beam image position on the path) and used for ranging. Both processes are described with reference to the flow chart of FIGS. 7A, 7B.

Routine BEAM CALIBRATION AND RANGING begins at step 100 with the selection of a beam path, for example, path 67 of FIG. 4. The beam paths from which the selection is made are predetermined and stored in memory 21 such that each beam is associated with one of the beam paths and no more than a predetermined number of beams is associated with any one beam path. At step 102 the system searches the beam path to find beam images. This can be accomplished, for example by finding any beam image that intersects the path or comes within a predetermined distance from the path. At step 104, the system retains up to three largest beam images found on the beam path, with any others being discarded. At step 106 the center of gravity Cg(x,y) of each retained beam image is calculated; and at step 108, the distance of the calculated center of gravity of each retained beam image to the path |Cg(x,y)−Path(x',y)| is compared to an offset threshold; and the beam image is discarded at step 110 if the distance is greater than the offset threshold. Continuing in FIG. 7B, step 112 determines if more than one beam image is retained. If so, it is labelled to the path at step 114. If not, the largest of the retained beam images is labelled to the path at step 116. In the example of FIG. 4, with the selection of beam path 67, beam image 2,1 would be found and labelled to the path. If the process is applied to calibration, at step 118 the distance of the target will be calibrated to the position of the center of gravity of beam image 2,1 along beam path 67 and stored in memory 21, for example in an array of such calibration data used to define positions for each beam image along its associated beam path relative to variation of the target distance. Alternatively, if the process is applied to ranging, the position of the target surface on beam path 67 will be determined from the stored, calibrated value determined in the calibration process for the detected position of beam image 2,1 on the beam path, with interpolation if required, and stored in memory 21, for example in an array of such target distances that together characterize the target surface 15. Finally, at step 120, the routine would return to step 100 and repeat the process for the next chosen beam path until all beam paths have been processed and the distances determined for all beam images. The surface would then be characterized by the pattern of the determined distances.

As long as no two beam images are labelled to the same beam path, the system described above will provide surface characterizations with a high degree of confidence. But as the resolution of such a system is increased for example by increasing the number of beam paths (equivalent to decreasing the horizontal distance between beam paths) without decreasing the beam image size, a point will be reached where multiple beam images become labelled to the same beam path. Such beam images that appear on the same beam path are spatially confused; and the procedure must be modified to label them with the highest degree of confidence.

Figure 8:
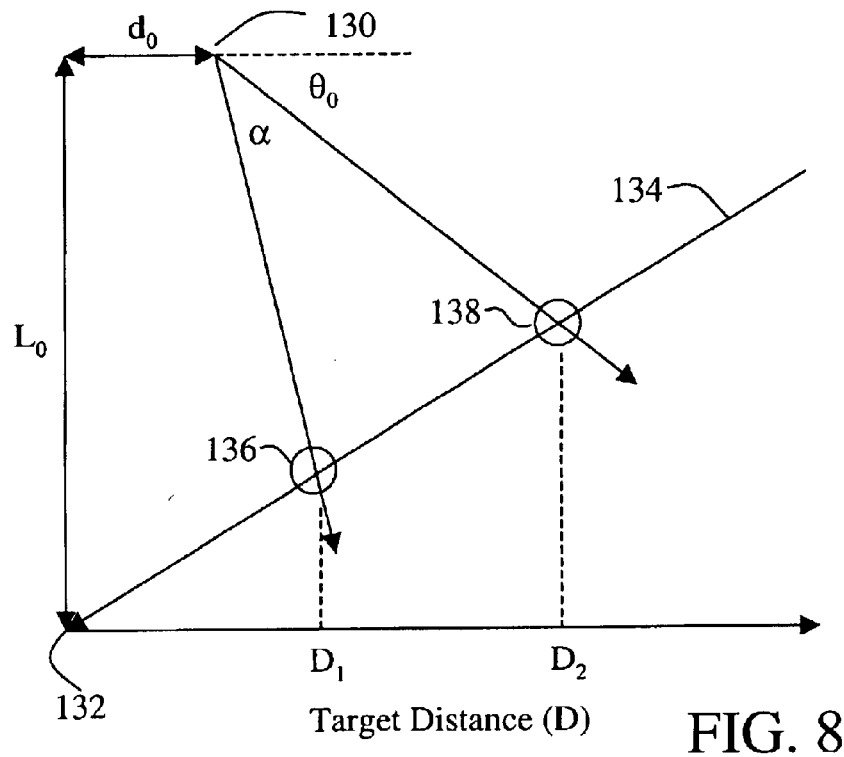
FIG. 8 is a chart illustrating an aspect of this invention.

An example of spatially confused beam images is shown in FIG. 8, in which the emitter optical center 130 is separated from the receiver optical center 132 by a distance $d_0$ in the direction and a distance 14 in the direction. Two beam images 136 and 138 are sufficiently close to alignment in the triangulation direction that they are aligned, as shown by the line 134, and will thus overlap on the image plane. The definition of "overlap" as used here is that the beam images cannot be distinguished with a predetermined degree of confidence: for example, that the distance between their calculated centers of gravity is smaller than a predetermined separation distance based on experimental error and similar factors. Beam images 136 and 138 are presented in FIG. 8 with different target distances $D_1$ and $D_2$ respectively. If these beam images were presented with the same target distance, the beam image locations on the image plane would not be aligned; they would have a known sequence order and could thus be distinguished. The target distance difference $D_1-D_2$ has a critical value above which the order of the beam images cannot be distinguished, which is expressed in the following equation:

$$D_2 - D_1 = \frac{D_2(D_2 - d_0)F}{L_0 + d_0\tan\theta_0 - D_2F}$$

wherein $F=\tan(\theta_0+\alpha)-\tan\theta_0$, and the angles $\theta_0$ and $\alpha$ are as shown in FIG. 8. If the critical target distance is greater than the system sensing range, the critical conditions will never occur, and the prior knowledge of the normal order can then be used for discrimination. To optimise the system, the right hand side of the equation should be as large as possible. Due to the requirement of distance resolution, the most flexible parameter in the system is $\alpha$. A study of the effects of varying $\alpha$ indicates that larger angular separation between confused beam images should be preferred for better discrimination.

Figure 5:
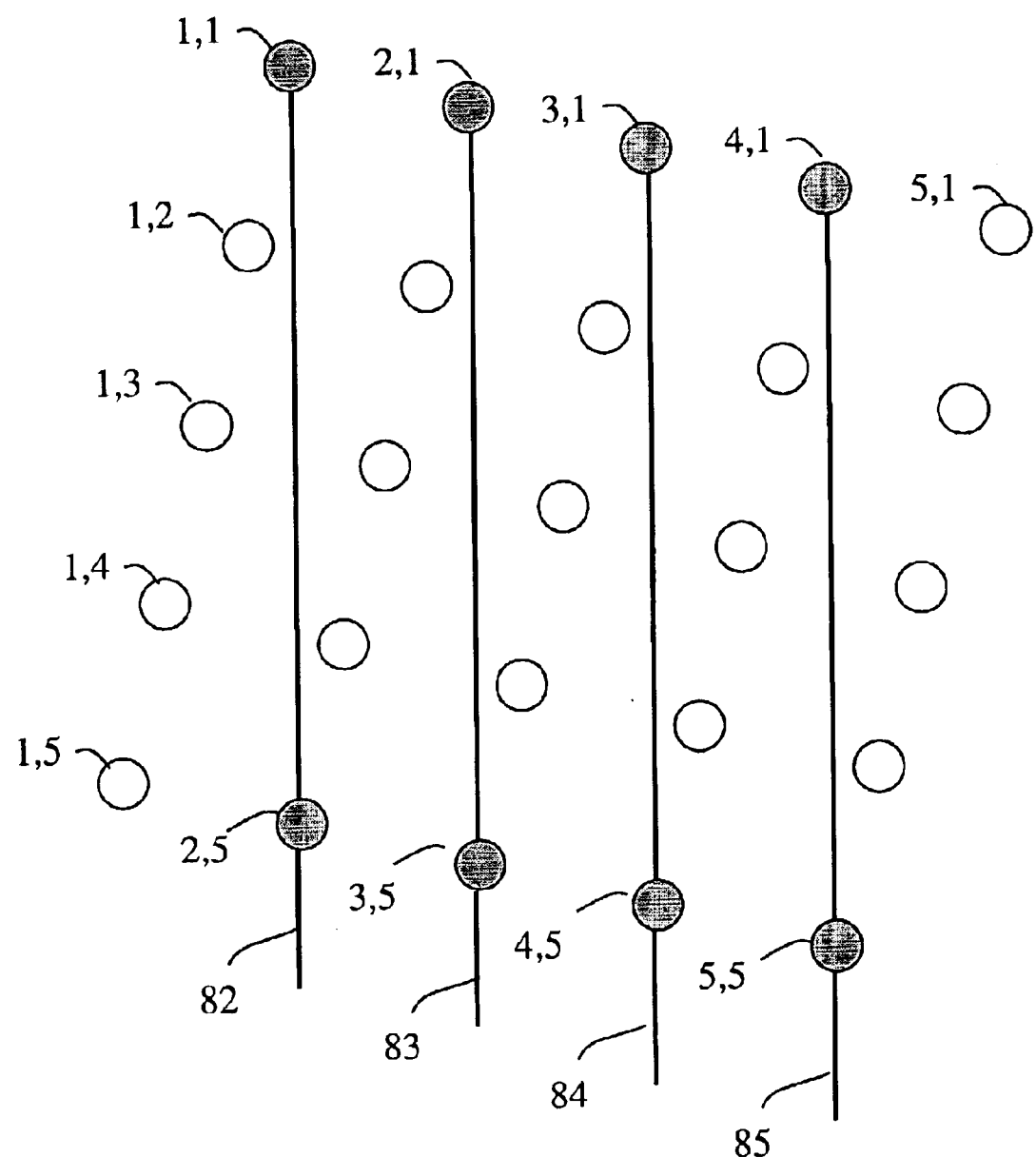
Figure 6:
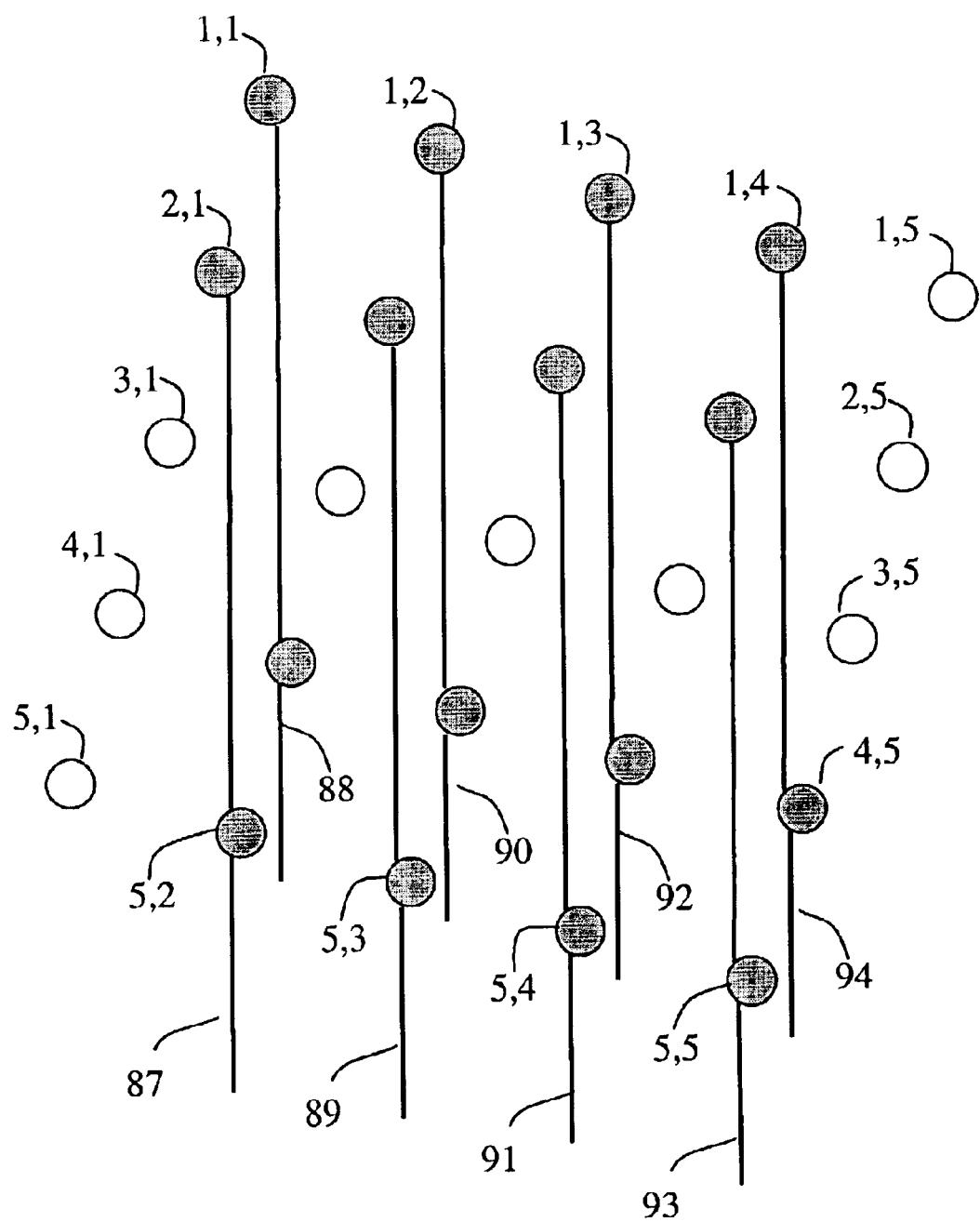
Figure 9A:
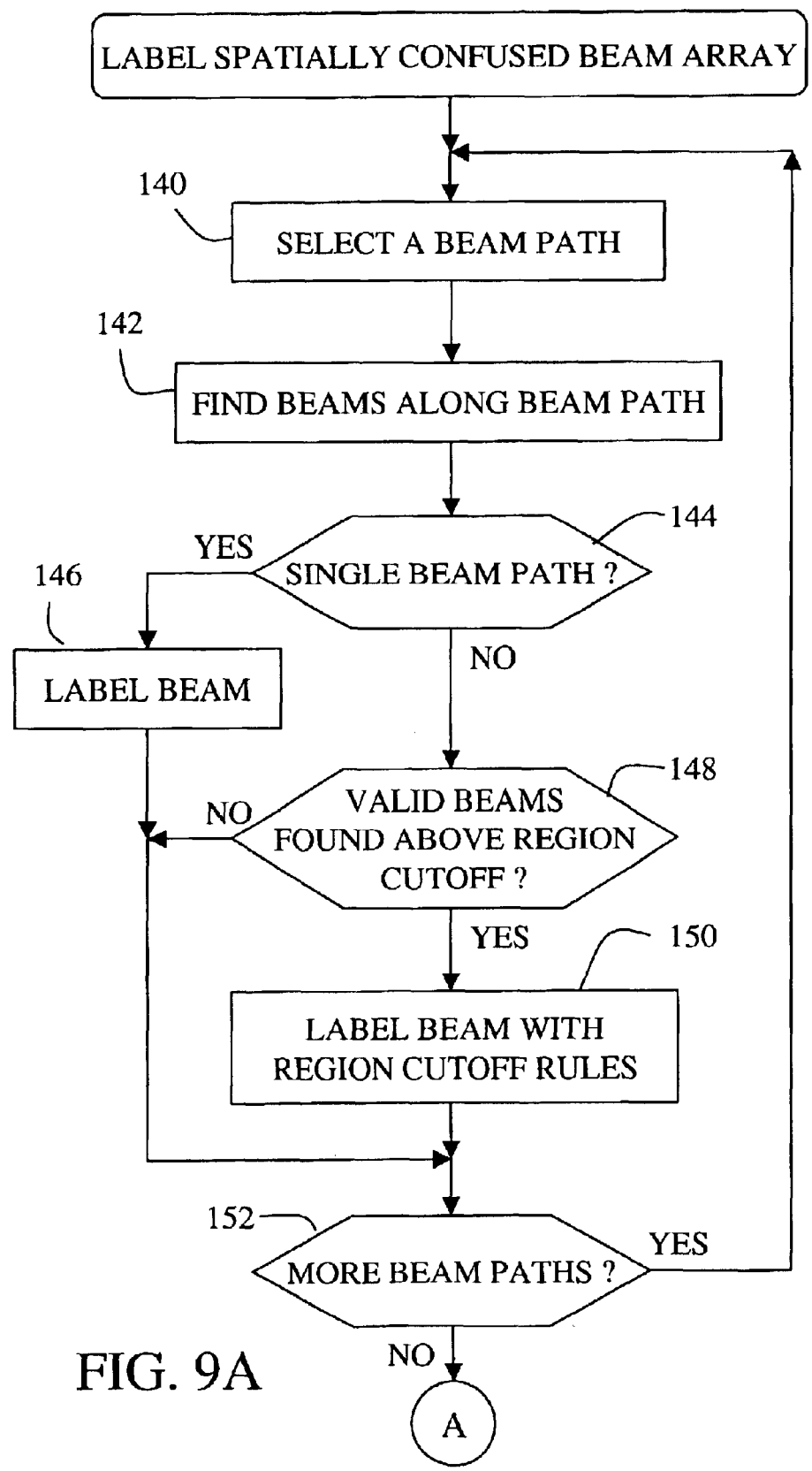
FIGS. 9A and 9B show a flow chart illustrating an aspect of a preferred embodiment of this invention.

Examples of arrays in which two beam images appear on certain beam paths are shown in FIGS. 5 and 6. In FIG. 5, beam path 82 includes beam images 1,1 and 2,5, which are shaded in the Figure. Similarly, each of beam paths 83, 84 and 85 includes two shaded beam images as indicated in the Figure. The remaining 17 beam paths are not shown, to avoid unnecessary clutter; but each includes just one of the remaining beam images, the beam images being shown unshaded for contrast. In FIG. 6, beam path 87 includes beam images 2,1 and 5,2, which are shaded in the Figure. Similarly, each of beam paths 88–94 includes two shaded beam images as indicated in the Figure. The remaining 9 beam paths are not shown, to avoid necessary clutter; but each includes just one of the remaining beam images, the beam images being unshaded for contrast. For arrays such as these, a different process for beam labelling is employed as described with reference to the flow chart of FIGS. 9A and 9B.

Prior to the beginning of the beam labelling process, the beam paths are created by plotting beam image location (center of gravity Cg(x,y)) on the image plane at different target distances and deriving a best fit linear path for each beam path. From a priori knowledge of the apparatus, each beam path is identified as a single beam path or a shared (two) beam path. The routine LABEL SPATIALLY CONFUSED BEAM ARRAY is described as two consecutive sub-processes or "passes," the first comprising steps 140–152 shown in FIG. 9A and the second comprising steps 154–166 shown in FIG. 9B. The first pass acts on all the beam paths and begins at step 140, shown in FIG. 9A, by selecting a beam path. At step 142, the routine searches the selected beam path for all valid beam images. A valid beam image is selected if its size exceeds a predetermined reference and its center of gravity Cg(x,y) is less than a predetermined distance from the beam path.

At step 144, the routine then checks the stored identity of the beam path to see if it is a single beam path. If the selected beam image is a single beam path, the beam image is labelled at step 146. This involves a selection of one beam image from the valid beam images identified along that beam path; and this may proceed as described in steps 102–116 of the flow chart of FIGS. 7A and 7B, wherein a single beam image is identified and labelled on a beam path where a maximum of one beam image is expected, with the following addition. Because the beam paths and beam images are packed tighter in this higher resolution array, a second distance test is preferably performed on each beam image remaining in the process just before step 116. This second distance test is the same as that of step 108—that is, comparing the distance between the center of gravity of the beam image and the path with a threshold—but with a smaller threshold than that used in step 108. Any beam image falling outside the new, smaller threshold is discarded; and the routine then proceeds to step 116 where the largest remaining valid beam image (the only beam image if only one remains) is selected and labelled to the beam path. If no valid beam image is found that meets the criteria for a single beam path, than no beam image is labelled. Regardless of whether or not a beam image is labelled to the beam path, the routine proceeds from step 146 to step 152, whereat it determines if there are more beam paths to process. If there are more beam paths, the routine returns to step 140 to select the next unsearched beam path.

Figure 10:
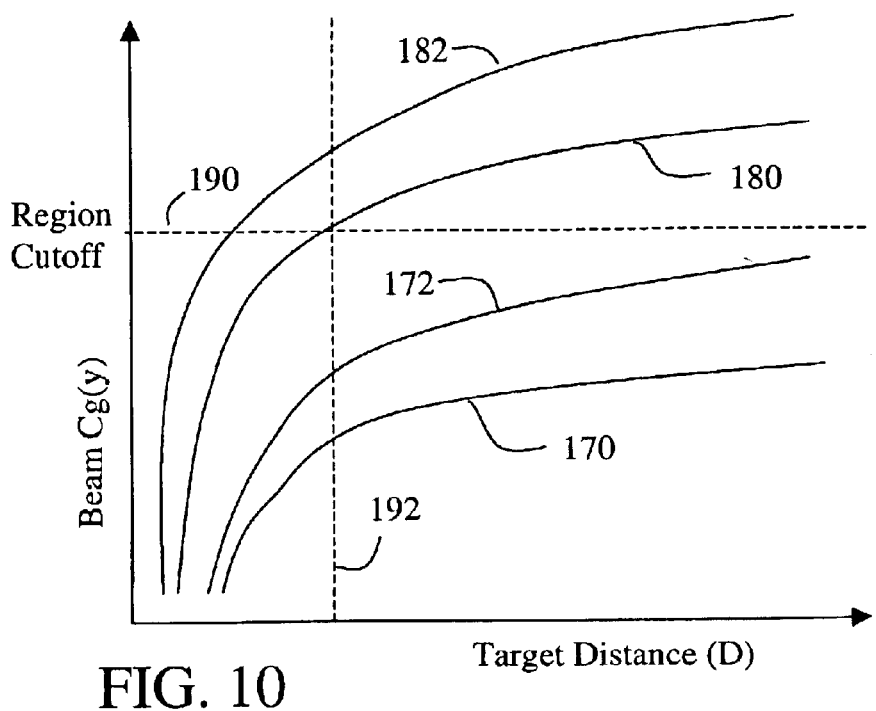
FIG. 10 is a graph of beam center of gravity as a function of target distance illustrating an aspect of this invention.

If the selected beam path was not identified as a single beam path at step 144, it must be a shared beam path. With such a result at step 144, the routine process to step 148, at which it is determined if any valid beam images are found located along the beam path beyond a region cutoff. In explanation of the phrase "region cutoff" attention is called to the curves of FIG. 10, which define the ranges of beam image locations for a shared beam path as a function of target distance (which corresponds to distance along the path). The curves for individual beam images fall within two distinct and separated ranges: the first defined between lines 170 and 172 and the second defined between lines 180 and 182. In fact, for each shared beam path one of the beam images will be in the first of these ranges and the other will be in the second of these ranges. A region exists to the right of vertical dashed line 192 (i.e. greater than a predetermined target distance) wherein all curves within the second of these ranges are above a region cutoff value (dashed horizontal line 190) and all curves within the first of these ranges are below the region cutoff value. Thus, if target distance is greater than the value indicated by vertical line 192, the beam path can be divided into two regions by the region cutoff line 190 and each of the beam images must be in a separate one of the shared regions. For smaller target distances (to the left of vertical line 192), it is possible that both beam images may be in the region below the region cutoff line 190; but it is not possible for both to be above the region cutoff. Thus, if any beam images for a shared beam path are found above the region cutoff value at step 148, the region cutoff rules are applied at step 150 to determine if the beam images may be labelled to the selected beam path. At step 150, if one beam image is located above the region cutoff, one beam image is located below the region cutoff and no more beam images are identified with the beam path, then both beam images are labelled to the beam path. It should be noted that no test need be performed to determine whether the target distance is greater than the value of vertical line 192 as shown in FIG. 10; since this will be determined, for the purposes of this routine, by whether a valid beam image is found above the region cutoff. The region cutoff value (dashed line 190) will be determined for each shared beam path as some margin above the highest possible value of the range of the lower beam image (in the group between curves 170 and 172).

But the beam path is still spatially confused if (1) no beam images are labelled to the shared beam path at step 150 or (2) no beam image is found above the region cutoff at step 148. In either of these cases, the beam path will be marked as spatially confused (temporarily) and, if step 152 finds more beam paths to process, the routine will return to step 140 to select the next beam path.

Figure 9B:
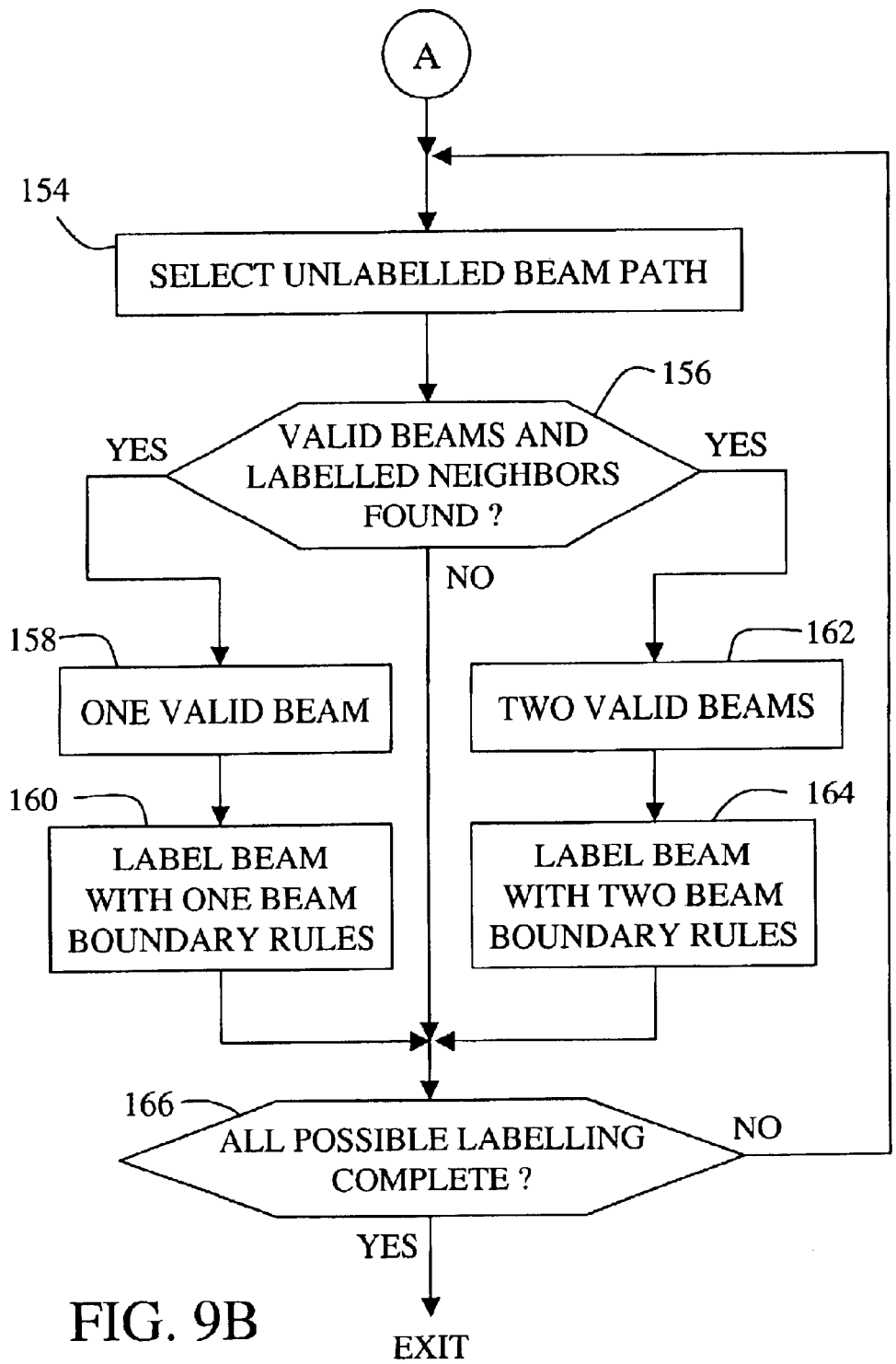

From step 152, when there are no more beam paths to be searched, the routine proceeds to step 154, shown in FIG. 9B. At this point, a beam path is selected from those marked (temporarily) as spatially confused, and the routine proceeds to step 156, for a determination of whether a set of boundary rules may be applied to label the beam images of a shared beam path. This set of rules basically attempts to identify and label either one or two beam images on a shared beam path, to a predetermined degree of confidence, by means of its (their) neighboring labelled beam images.

If two beam images share a beam path, the higher ordered beam image may be designated beam image A and the lower ordered beam image may be designated beam image B. A confused beam image with Cg (y)=y may be labelled to A or B and resultant target distances will be $D_A$ and $D_B$, respectively. The four way adjacent labelled beam images in the image plane are chosen as boundary conditions to estimate the beam image labels. Assume beam image B is associated with label (i,j) and beam image A is associated with label (i+4, j+1). The immediate four-way neighbors of A are the beam images with labels (i+4±1, j+1) and (i+4, j±1). Similarly, the B neighbors are the beam images with labels (i±1, j) and (i, j±1). If these neighbors are all or partially labelled without confusion, their target distance values will be used to estimate the reasonable labels of the confused beam images.

To do this, both the averaged target distance $D_A$(ave) for the labelled A neighbors and the averaged target distance $D_B$(ave) for the labelled B neighbors are calculated. The boundary conditions are further evaluated with the distance standard deviation $S_a$ and $S_b$ for the labelled A and the labelled B neighbors, respectively. A normalized "pulling" factor is calculated as:

$$F=|C_b|/(|C_a|+|C_b|),$$

Where $C_a=|D_A-D_A(\text{ave})|$ and $C_b=|D_B-D_B(\text{ave})|$. Clearly, F has a value between 0 and 1. When F is larger than 0.5, the confused beam image is closer to A boundary. Otherwise, the confused beam image is closer to B boundary. A threshold T can be established based on an acceptable confidence level so that when T<=F the confused beam image will be labelled as A. When 1−T>=F the confused beam image will be labelled as B. For all other conditions the beam image will not be labelled due to lack of confidence. This process is called one-beam boundary rules.

The confidence of one-beam boundary rules will depend on the number of neighboring beam images used and the boundary conditions. For the former, an adaptive threshold $T_n$ is created as $T_n$=kN+b, where N is the number of labelled beam images among the neighboring beam images of A and B (four each). N may clearly range from 1 to 8. In addition, k and b are constants that depend on the choice of the threshold of confidence desired. For example, when $T_n$ is chosen as 0.55 and 0.85 for N=8 and N=1, respectively, the equation will become $T_n$=0.893−0.043N. In this model, each neighboring beam image is considered equal and the confidence level increases linearly with the number of beam images used for the label. For the boundary conditions, an adaptive threshold $T_s$ is created as $T_s=(S_a+S_b)/2(C_a+C_b)$. This threshold takes the boundary variations into account as a confidence factor. When the boundary variations are large compared with the "pulling" factors, the confidence for labelling becomes lower. The overall threshold T for the labelling is $T=T_n+T_s$.

Referring again to the flow chart of FIG. 9B, at step 156 it is determined if valid beam images are found with labelled neighbors. If only one valid beam image is found (158) the beam image will be labelled (or not) at step 160 according to the one-beam boundary rules as described above. If two valid beam images in the confused beam path are found (162), two-beam boundary rules will alternatively be applied at step 164. In two beam boundary rules, the one-beam boundary rules will be applied to both beam images. If the results are consistent, both beam images will be labelled accordingly. If there are any inconsistencies, neither beam image will be labelled. If the required valid beam images are not found at step 156, no beam images will be labelled for the selected shared beam path. From any of steps 156, 160 and 164, the routine proceeds to determine, at step 166, if all possible labelling of shared beam paths is complete. If not, the routine returns to step 154 to select a still confused beam path. When all possible labelling is complete, any beam paths still confused are marked as unlabelled, along with any single beam path for which no valid beam images were found.

Figure 7A:
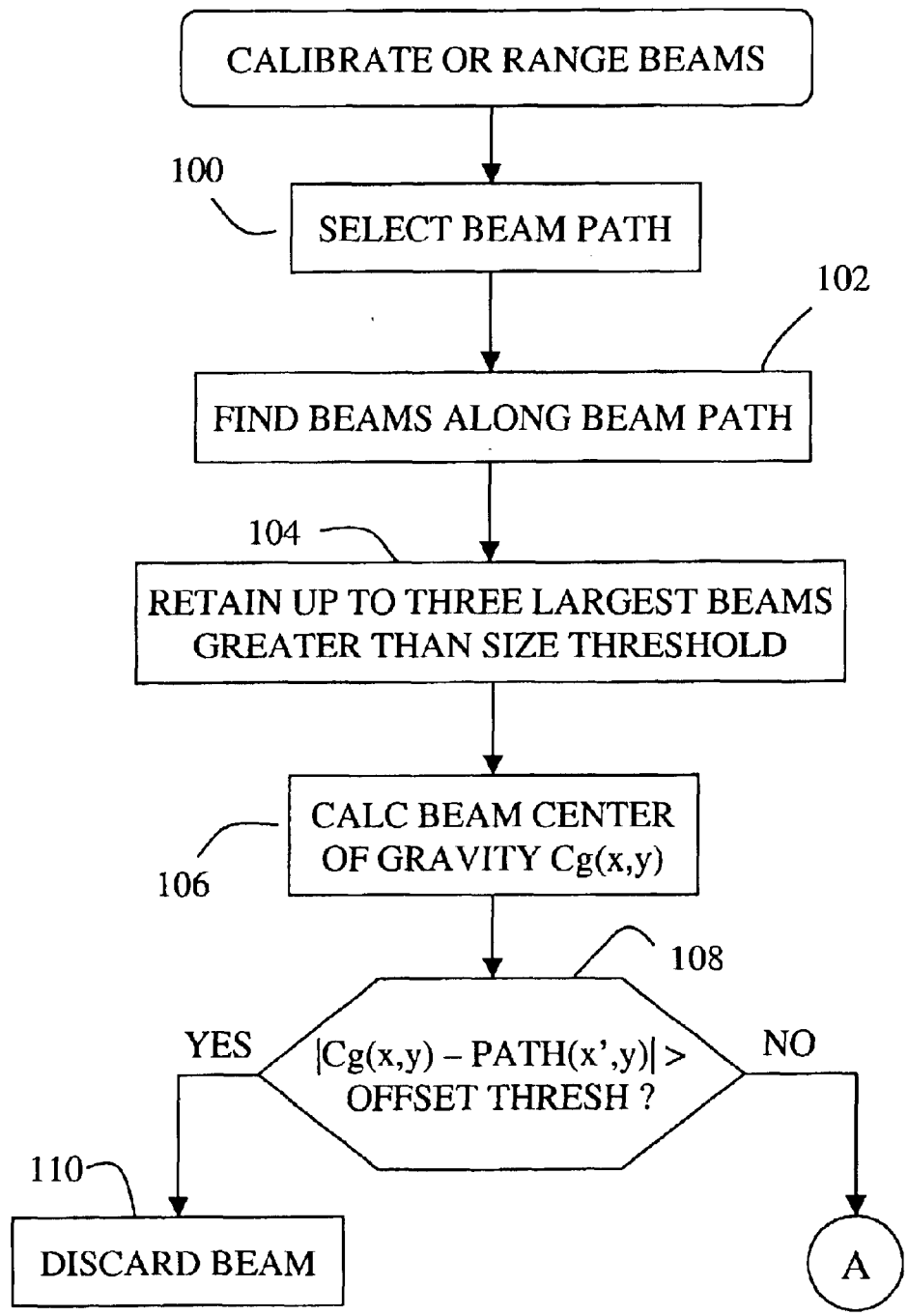
FIGS. 7A and 7B show a flow chart illustrating an aspect of a preferred embodiment of this invention.
Figure 7B:
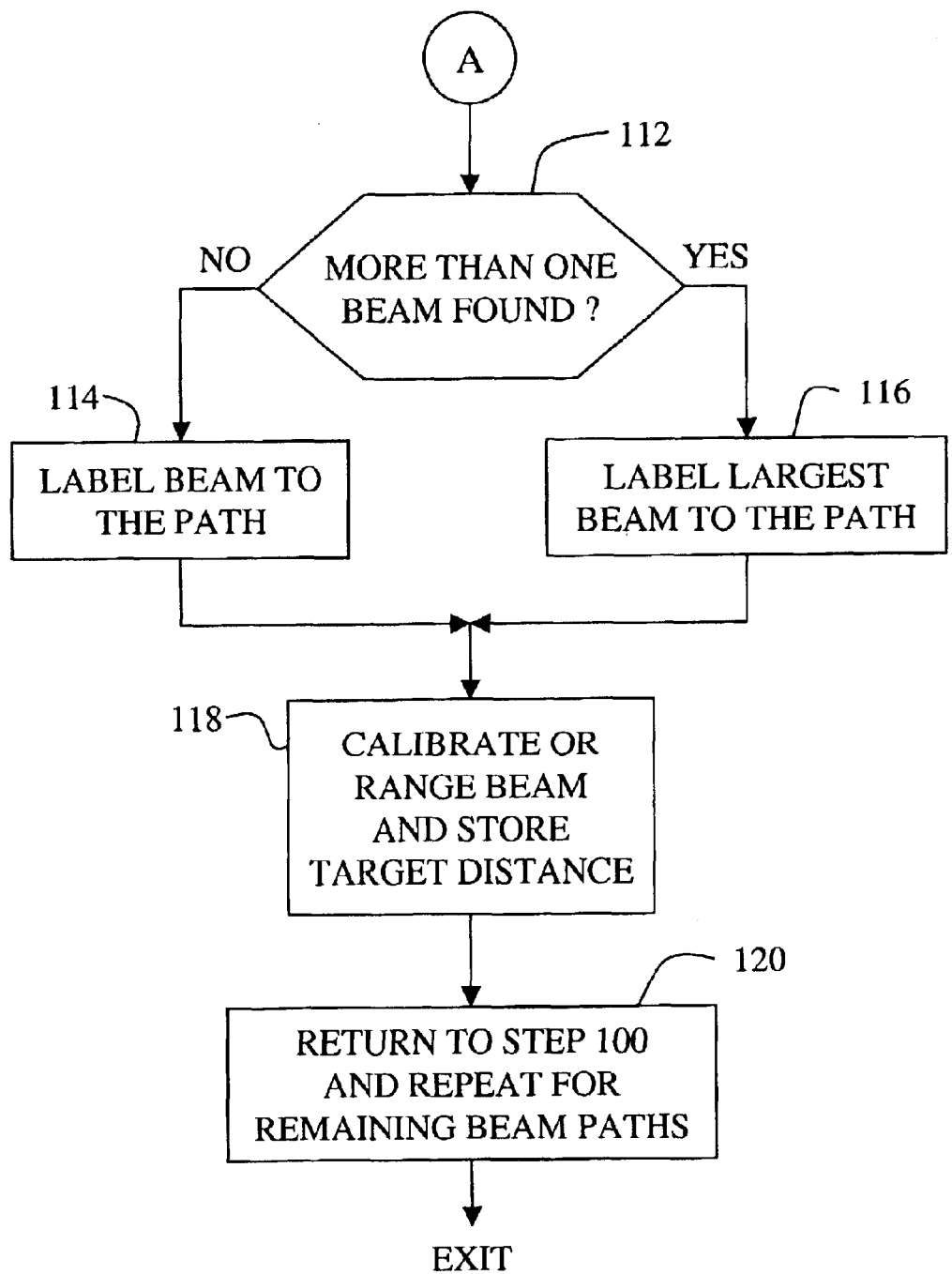

Once the beam images are labelled to the proper beam paths, the results can be used, as in the system described with respect to FIGS. 7A and 7B, for either calibration or ranging. In the former case, known target distances are used and look-up tables are calibrated for such distances for locations along the beam paths. The latter case is just the reverse, in which an unknown surface is presented and the stored look-up table used to convert locations along the beam paths to an array of target distances, and thus a target surface characterization. For the former case, unlabelled beam images are not acceptable, since they would leave "holes" in the look-up table. But with the use of a planar target such unlabelled beam images can only be the result of improperly designed or operating equipment; and such problems can be fixed. In the latter case, some irregular surfaces (in shape, color, etc.) can occlude certain beam images so that they are not seen. In such cases, even with equipment that is designed and operating properly, confused beam paths may provide no value for target distance and leave "holes" in the array of detected surface points.

What is claimed is:

1. Apparatus comprising:
    a source of electromagnetic radiation;
    an optical grating receiving the electromagnetic radiation and emitting a regular array of beams in rows and columns toward an object surface;
    a camera having an image plane, a lens for focusing the beams of the array reflected from the object surface as an array of beam images on the image plane and means for deriving positional data for each of the beam images on the image plane, each of the beam images having a position on the image plane that moves substantially linearly with variation of a target distance between the optical grating and a point on the object surface from which that beam image is reflected, the direction of the substantially linear movement of each beam image forming a predetermined angle with the column of the array of beam images on the image plane to which that beam image belongs at a common target distance; and
    a processor for the positional data comprising:
        a memory storing reference data (1) defining predetermined beam image paths corresponding to the substantially linear movement of the beam images, (2) associating each of the beam images of the array of beam images with one of the beam paths such that no more than a predetermined number of beam images is associated with each of the beam paths and (3) defining positions for each of the beam images along its associated beam path relative to variation of the target distance;
        means using the stored reference data for locating, and determining the associated one of the predetermined beam paths for, each of the beam images on the image plane;
        means for determining the location of each of the beam images along its associated one of the predetermined beam paths and, responsive to the determined location, using the stored reference data for determining the target distance for that beam image; and
        means for storing an array of the determined target distances for each of the located beam images referenced to the emitted regular array of beams to characterize the object surface.

2. The apparatus of claim 1 wherein the predetermined angles are defined between the columns and rows of the regular array of beams emitted by the optical grating.

3. The apparatus of claim 2 wherein the predetermined angles are at least partly defined by a rotation of the optical grating relative to the direction of the substantially linear movement of one of the beam images.

4. The apparatus of claim 1 wherein the predetermined angles provide a separate one of the predetermined beam paths on the image plane for each beam image.

5. The apparatus of claim 1 wherein the predetermined angles provide a first set of the predetermined beam paths each associated with a pair of the beam images on the image plane and a second set of the predetermined beam paths each associated with only one of the beam paths on the image plane.

6. The apparatus of claim 5 wherein:
    the memory further defines, for each of the first set of the predetermined beam paths, a region cutoff datum defining an allowable range of locations thereon which are possible for only one of the pair of associated beam images; and
    the processor further comprises means responsive to location of only the one of the pair of associated beam images within the allowable range of locations and the location of the other of the pair of associated beam images not within the allowable range of locations to uniquely label each of the pair of associated beam images with reference to the emitted regular array of beams.

7. The apparatus of claim 6 wherein the processor further comprises means responsive to neither of the pair of associated beam images being located within the allowable range of locations to uniquely label each of the pair of associated beam images at least partly responsive to the locations of others of the beam images uniquely identified on others of the predetermined beam paths.

8. The apparatus of claim 7 wherein the unique identification of each of the pair of associated beam images is determined responsive to distances on the image plane between each of the pair of associated beam images and predetermined neighboring ones of the uniquely identified others of the beam images.

9. A method for characterizing an object surface comprising the steps:
    generating electromagnetic radiation;
    receiving the electromagnetic radiation with an optical grating and emitting the electromagnetic radiation therefrom in a regular array of beams in rows and columns toward the object surface;
    focusing ones of the beams of the array reflected from the object surface through a lens onto an image plane of a camera as an array of beam images on the image plane, each of the beam images having a position on the image plane that moves substantially linearly with variation of a target distance between the optical grating and a point on the object surface from which that beam image is reflected, the direction of the substantially linear movement of each beam image forming a predetermined angle with the column of the array of beam images on the image plane to which that beam image belongs at a common target distance;
    deriving positional data for each of the beam images on the image plane; and
    storing reference data (1) defining predetermined beam image paths corresponding to the substantially linear movement of the beam images, (2) associating each of the beam images of the array of beam images with one of the beam paths such that no more than a predetermined number of beam images is associated with each of the beam paths and (3) defining positions for each of the beam images along its associated beam path relative to variation of the target distance;
    using the stored reference data for locating, and determining the associated one of the predetermined beam paths for, each of the beam images on the image plane;

determining the location of each of the beam images along its associated one of the predetermined beam paths and, responsive to the determined location, using the stored reference data for determining the target distance for that beam image; and storing an array of the determined target distances for each of the located beam images referenced to the emitted regular array of beams to characterize the object surface.

10. The method of claim 9 wherein the predetermined angles are defined between the columns and rows of the regular array of beams emitted by the optical grating.

11. The apparatus of claim 9 wherein the predetermined angles are at least partly defined by a rotation of the optical grating relative to the direction of the substantially linear movement of one of the beam images.

12. The method of claim 9 wherein the predetermined angles provide a separate one of the predetermined beam paths on the image plane for each beam image.

13. The method of claim 9 wherein the predetermined angles provide a first set of the predetermined beam paths each associated with a pair of the beam images on the image plane and a second set of the predetermined beam paths each associated with only one of the beam paths on the image plane.

14. The apparatus of claim 13 further comprising the steps:

storing, for each of the first set of the predetermined beam paths, a region cutoff datum defining an allowable range of locations thereon which are possible for only one of the pair of associated beam images; and uniquely labelling each of the pair of associated beam images with reference to the emitted regular array of beams responsive when only the one of the pair of associated beam images is located within the allowable range of locations and the other of the pair of associated beam images is not located within the allowable range of locations.

15. The method of claim 14 further comprising the step of uniquely labelling each of the pair of associated beam images at least partly responsive to the locations of others of the beam images uniquely identified on others of the predetermined beam paths when neither of the pair of associated beam images is located within the allowable range of locations.

16. The method of claim 15 wherein the unique identification of each of the pair of associated beam images is determined responsive to distances on the image plane between each of the pair of associated beam images and predetermined neighboring ones of the uniquely identified others of the beam images.

* * * * *